F. J. MACK.
CLUTCH.
APPLICATION FILED DEC. 7, 1915.
1,207,190.
Patented Dec. 5, 1916.
2 SHEETS—SHEET 1.
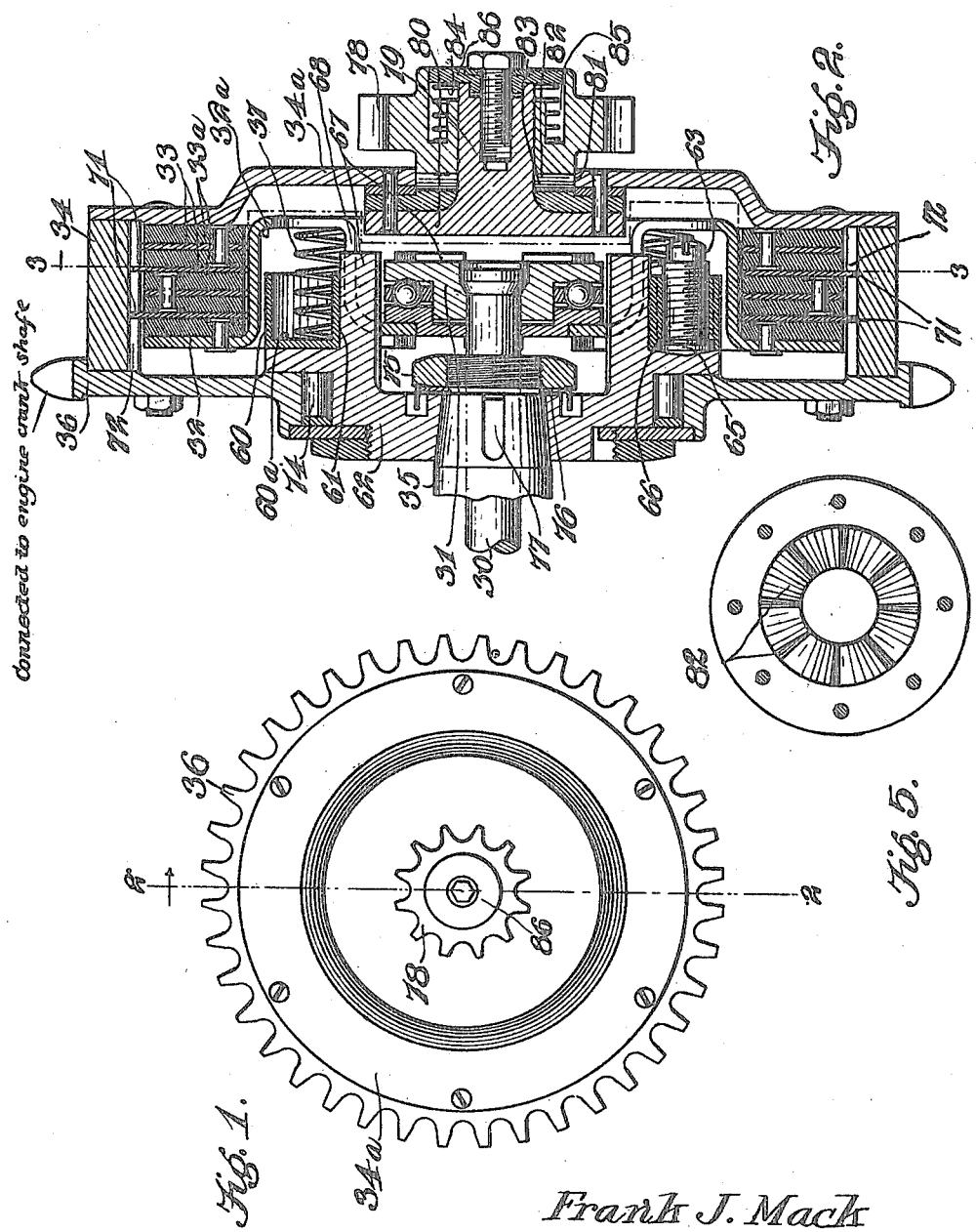
Frank J. Mack
INVENTOR.
BY
ATTORNEYS.

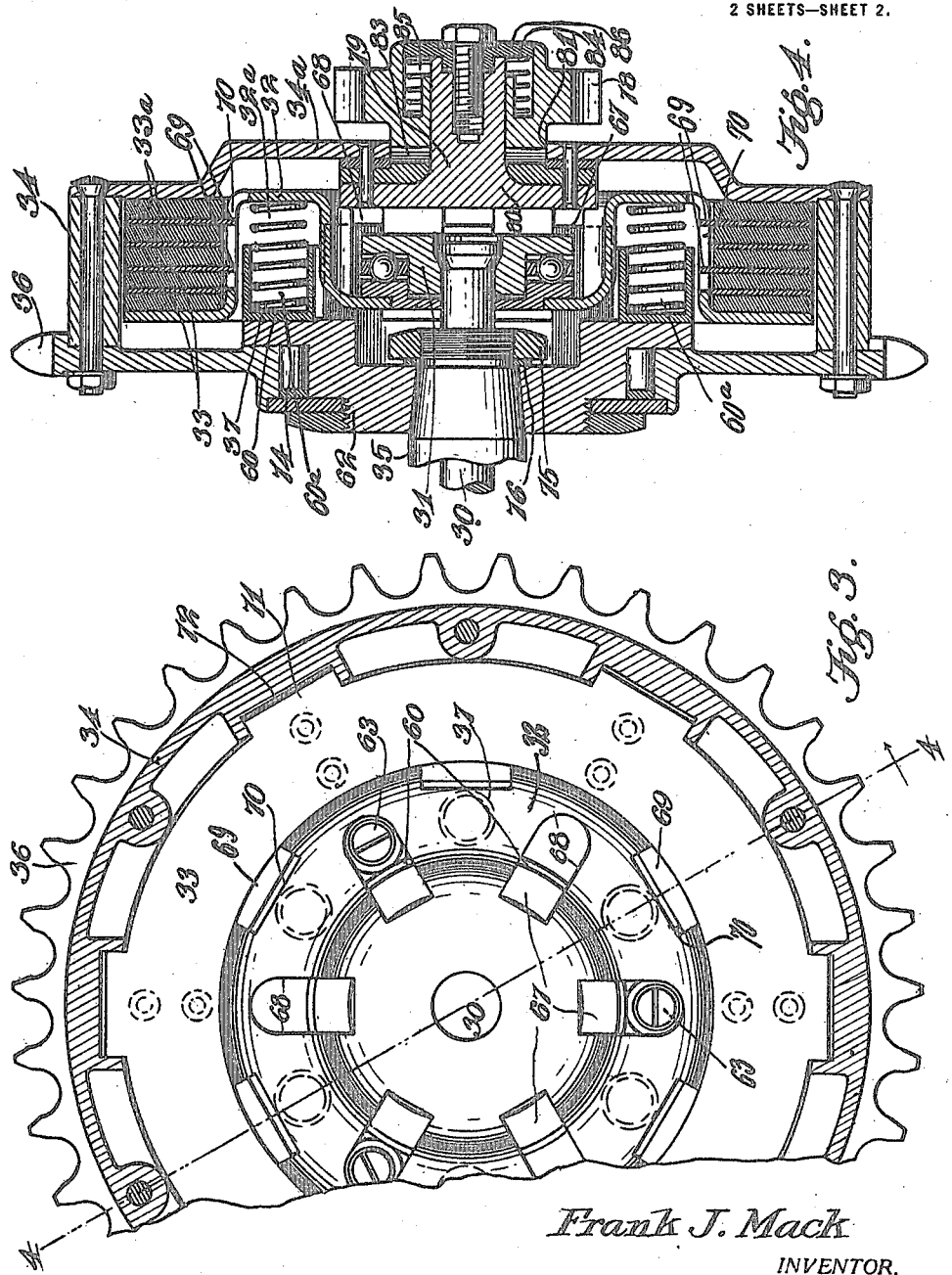

UNITED STATES PATENT OFFICE.

FRANK J. MACK, OF CHICAGO, ILLINOIS.

CLUTCH.

1,207,190.  Specification of Letters Patent.  Patented Dec. 5, 1916.

Application filed December 7, 1915. Serial No. 65,538.

*To all whom it may concern:*

Be it known that I, FRANK J. MACK, a citizen of the United States, residing at Chicago, in the county of Cook and State of Illinois, have invented new and useful Improvements in Clutches, of which the following is a specification.

This invention relates to clutches having friction disks which are connected to the driving and driven members in alternate order.

The invention has for its object to provide a novel and improved means for operating the friction disks, together with an assemblage of parts whereby the entire clutch mechanism is inclosed and arranged in a small and compact form.

The invention also has for its object to provide novel means for taking up wear of the friction disks, and also to provide a structure which is especially applicable to motor cycles.

With the objects stated in view, the invention consists in a novel combination and arrangement of parts to be hereinafter described and claimed, and in order that the same may be better understood, reference is had to the accompanying drawings forming a part of this specification.

In the drawings, Figure 1 is an elevation of the clutch; Fig. 2 is an enlarged vertical section on the line 2—2 of Fig. 1; Fig. 3 is a section, partly broken away, on the line 3—3 of Fig. 2; Fig. 4 is a section on the line 4—4 of Fig. 3, and Fig. 5 is a face view of a part hereinafter described.

Referring specifically to the drawings, the driven element is a shaft 35 and the driving element a sprocket wheel 36, or vice versa. On one side of the sprocket wheel is a chamber in which is housed the clutch mechanism which is the subject-matter of the present application for patent. This chamber is composed of an encircling wall 34 fixed to one side of the sprocket wheel or integral therewith, and closed at its outer end by a cap 34ª. The clutch is composed of a series of steel friction disks 33 having alternate locking engagement with the wall 34, and a member 32 fixed to the shaft 35 to turn the same. The friction disks 33 alternate with raybestos disks 33ª. Two of the steel disks have projecting lugs 69 at their inner peripheries which seat in slots 70 in the member 32; and the other two steel disks have lugs 71 projecting from the outer peripheries into slots 72 in the wall 34. Thus, the friction disks alternately have a driving connection with the wall 34 and the member 32, and as the wall 34 is fixed to the driving member 36 and the member 32 is fixed to the driven member 35, the motion of the former will be transmitted to the latter when the disks 33 and 33ª are jammed together.

On the end of the shaft 35 is fixed a hub 62 on which the sprocket wheel 36 runs, a roller bearing 74 being provided. The hub is fixed on the shaft by a nut 75 screwed on the end thereof, with a washer 76 between the nut and the shaft end, and the hub is also keyed on the shaft as shown at 77. The hub 62 extends into the chamber formed by the parts 34 and 34ª and is spaced therefrom, and the member 32 is fixed to this portion of the hub.

The member 32 is a disk having, some distance from its center, a crease which forms a circular channel 32ª on one side of the disk. In this channel are located coiled springs 37 abutting at one end against the disk and at the other end against a ring 60 seating loosely on the inner end of the hub 62, said end being reduced as indicated at 61 to accommodate the ring. The springs 37 tend to press the disk 32 in a direction to jam the disks 33 and 33ª together, the tension being sufficient to effect a driving connection. At regular intervals, the ring 60 carries screws 63 which are threaded through the ring so that their heads 65 are in engagement with the end of the hub 62. The outer ends of the screws are nicked for the application of a screw driver. The heads of the screws seat in recesses 66 in the back of the ring, and it will therefore be evident that when the screws are turned in the proper direction, the ring 60 will be forced outward or away from the end of the hub, to put greater tension on the springs. As the disks 33 and 33ª wear from friction, this wear may be taken up by increasing the tension of the springs in the manner described. The ring 60 has recesses 60ª in which the springs seat.

The disk 32 is connected to the hub 62 to turn the same, by means of a series of lugs 67 integral with and projecting from the inner end of the hub into openings 68 in the disk. These openings extend radially and are so located that some of them uncover the outer ends of the screws 63, so that access to the same, for the purpose hereinbefore described, may be had. As there are only three of these screws, a corresponding number of openings need only be elongated to uncover the same, but the openings are, preferably, all alike, so that any setting of the disk 32 will afford access to the screws.

The disks 33 and 33ª are located between the disk 32 and the cap 34ª and they are held pressed in the direction of the latter by the springs 37, the parts 32 and 34ª serving as the abutments between which the disks are jammed together to effect the driving connection between the sprocket wheel 36 and the shaft 35. To break this connection, the disk 32 must be backed, which is done by a rod 30 slidably seating in a central longitudinal opening in the shaft 35 and carrying a ball thrust collar 31 engageable with the same side of the disk 32 on which the friction disks are located. Thus it will be evident that when the rod is drawn outward, the disk 32 is backed against the tension of the springs 37 and the friction disks are freed, so that the motion of the sprocket wheel 36 is now not transmitted to the shaft 35. Upon returning the rod 30, the springs 37 at once restore the driving connection.

The clutch mechanism is entirely closed and has been designed more particularly for motor cycles, although it is not limited thereto. Any suitable means may be provided for actuating the rod 30. It will be noted that the rod 30 operates directly on the clutch and not through any intermediate parts, thereby reducing the number of parts required, simplifying the structure, and making the mechanism more reliable in operation.

As it is customary to provide motor cycles with a "kick starter", the clutch has been designed to accommodate one of the coöperating members of the starter. The outer wall or cap 34ª of the clutch housing carries the driven sprocket wheel 78 of the starter. This sprocket wheel is rotatably mounted on a stub shaft 79 fixed to the cap 34ª in axial alinement with the shaft 35. The shaft 79 has an enlarged inner end 80 located inside the cap 34ª and bolted or otherwise fixed thereto, the cap having an opening 81 through which the shaft passes. The cap 34ª also carries a ratchet disk 82, the teeth of which face the opening 81 and are opposite the inner end of the hub of the sprocket wheel 78, said hub end having ratchet teeth 83 which mesh with the teeth of the ratchet disk. The ratchet teeth are inclined so that slippage occurs when the sprocket wheel 78 rotates in one direction, said sprocket wheel being slidable on the shaft 79 for this purpose. A spring 84 holds the sprocket wheel pressed inward to engage its teeth with the teeth of the ratchet disk. This spring seats in a recess 85 in the outer face of the hub of the sprocket wheel. The outer end of the shaft 79 carries a disk 86 which closes the recess 85, the spring abutting at its outer end against this disk.

It will be evident from the foregoing that when the starting pedal or other part connected to the sprocket wheel 78 is operated, the sprocket wheel 36 will be turned through the ratchet mechanism, and as said sprocket wheel 36 is connected to the engine shaft, the engine will be started, it being understood that the engine is an internal-combustion engine. When the sprocket wheel 78 turns in the opposite direction no motion is transmitted, as the ratchet teeth slip.

The shaft 35 is the driven element, it being provided with a suitable driving connection with the hind wheel of the machine. The engine can be started, when the clutch is released, without setting into motion anything but the sprocket wheel 36, the casing 34, 34ª, and the parts carried by the casing, a direct connection being had between the engine and the starter 78 through the ratchet 83, casing parts 34ª and 34, sprocket wheel 36 and the connection between the latter and the engine crank shaft. It is also not necessary to place the transmission gear in neutral position.

I claim:

1. A clutch comprising driving and driven elements, friction disks connected to the driving and the driven elements in alternate order, springs for effecting the frictional engagement of the disks, a member carried by one of the elements and engaging the friction disks, said member being pressed by the springs, a ring carried by the element which carries the member, the springs being interposed between said member and the ring, and screws threaded through the ring and engaging the element which carries the ring, said screws being rotatable to force the ring outward from said element to increase the tension of the spring, the member engageable by the springs having openings which are in alinement with the screws.

2. In a clutch, a shaft having an axial opening, a hub fast on one end of the shaft, a rod slidably seating in the shaft opening and projecting from the aforesaid end thereof, an element rotatably mounted on the hub, a spring-actuated member slidably carried by the hub and turning therewith, friction disks connected to said element and to the spring-actuated member in alternate order, and a thrust collar carried by the aforesaid rod and engageable with the aforesaid member for moving the same in a direction to disengage the friction disks.

3. The combination of a driving element, a driven element, coöperating clutch members connected to said elements, a housing carried by the driving element and inclosing the clutch members, a controlling device for the clutch members entering the housing at one end, a starting element at the opposite end of the housing, and a ratchet driving connection between said element and the housing.

4. The combination of a shaft, a hub fast on one end of the shaft, a driving element mounted on the hub, coöperating clutch members connected to the hub and to the driving element, a housing carried by the driving element and inclosing the clutch members, a controlling device for the clutch members entering the housing at one end, a shaft fixed to the opposite end of the housing in line with the first-mentioned shaft, a starting element loosely mounted on the second-mentioned shaft, and a ratchet driving connection between said element and the housing.

5. In a clutch, a shaft having an axial opening, a hub fast on one end of the shaft, a rod slidably seating in the shaft opening and projecting from the aforesaid end thereof, an element rotatably mounted on the hub, a spring-actuated member slidably carried by the hub and turning therewith, friction disks connected to said element and to the spring-actuated member in alternate order, a thrust collar carried by the aforesaid rod and engageable with the aforesaid member for moving the same in a direction to disengage the friction disks, and a housing carried by the aforesaid element and inclosing the friction disks and the thrust collar.

6. In a clutch, a shaft having an axial opening, a hub fast on one end of the shaft, a rod slidably seating in the shaft opening and projecting from the aforesaid end thereof, an element rotatably mounted on the hub, a spring-actuated member slidably carried by the hub and turning therewith, friction disks connected to said element and to the spring-actuated member in alternate order, a thrust collar carried by the aforesaid rod and engageable with the aforesaid member for moving the same in a direction to disengage the friction disks, and a housing carried by the aforesaid element and inclosing the friction disks and the thrust collar, the friction disks being positioned between the spring-actuated member and the side wall of the housing.

7. A clutch comprising driving and driven elements, one of said elements including a disk slidable relative to said element and turning therewith, and having on one side an outstanding part defining on the other side a circular channel, springs engaging the last-mentioned side of the disk and seating in the channel, friction disks connected to one of the elements and to the aforesaid disk of the other element in alternate order and located on the first-mentioned side of said disk outside the outstanding part, a thrust collar engaging the disk inside the outstanding part, and an actuating rod carrying the thrust collar and passing through the center of the disk.

8. The combination of a driving element having a connection with an internal-combustion engine, a driven element, coöperating clutch members connected to said elements, a controlling device for the clutch members, a starting element carried by the driving element, and a ratchet driving connection between said driving and starting elements, the same being the sole connection between the driving and starting elements.

9. The combination of a driving element having a connection with an internal-combustion engine, a driven element, coöperating clutch members connected to said elements, a housing fixed to the driving element and inclosing the clutch members, a controlling device for the clutch members entering the housing at one end, a shaft directly connected with the driving element, said shaft being fixed to the end of the housing opposite the first-mentioned end, a starting element loosely mounted on the shaft, and a ratchet driving connection between said element and the housing.

In testimony whereof I affix my signature.

FRANK J. MACK.